United States Patent
Jack et al.

(10) Patent No.: US 10,165,459 B2
(45) Date of Patent: Dec. 25, 2018

(54) REMOTE MONITORING OF FRONTHAUL RADIO SIGNALS

(71) Applicant: Verizon Patent and Licensing Inc., Arlington, VA (US)

(72) Inventors: Edward M. Jack, Ashby, MA (US); Said Soulhi, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 15/258,446

(22) Filed: Sep. 7, 2016

(65) Prior Publication Data

US 2018/0070246 A1   Mar. 8, 2018

(51) Int. Cl.
*H04W 24/08* (2009.01)
*H04W 88/08* (2009.01)

(52) U.S. Cl.
CPC .......... *H04W 24/08* (2013.01); *H04W 88/085* (2013.01)

(58) Field of Classification Search
CPC ............................. H04W 24/08; H04W 88/085
See application file for complete search history.

(56) References Cited

U.S. PATENT DOCUMENTS

| | | | |
|---|---|---|---|
| 2002/0024700 A1* | 2/2002 | Yokoyama | H04Q 11/0066 398/98 |
| 2016/0113018 A1* | 4/2016 | Li | H04W 72/0493 709/226 |
| 2017/0237495 A1* | 8/2017 | Lee | H04B 10/275 398/79 |
| 2017/0251493 A1* | 8/2017 | Zhang | H04W 74/002 |
| 2017/0257151 A1* | 9/2017 | Lange | H04B 7/04 |
| 2017/0272365 A1* | 9/2017 | Wei | H04L 47/20 |

* cited by examiner

*Primary Examiner* — Omar J Ghowrwal

(57) ABSTRACT

One or more remote radio probes (RRPs) may be installed in the fronthaul network of a cellular Radio Access Network. Each RRP may be designed as to be permanently, or semi-permanently, placed in the fronthaul network. The RRP may be designed to capture baseband radio data transmitted through the fronthaul network. The RRP may buffer and forward the captured baseband radio data to an analysis platform. The analysis platform may be a software implemented platform to perform signal and/or spectral analysis of the received baseband radio data.

20 Claims, 10 Drawing Sheets

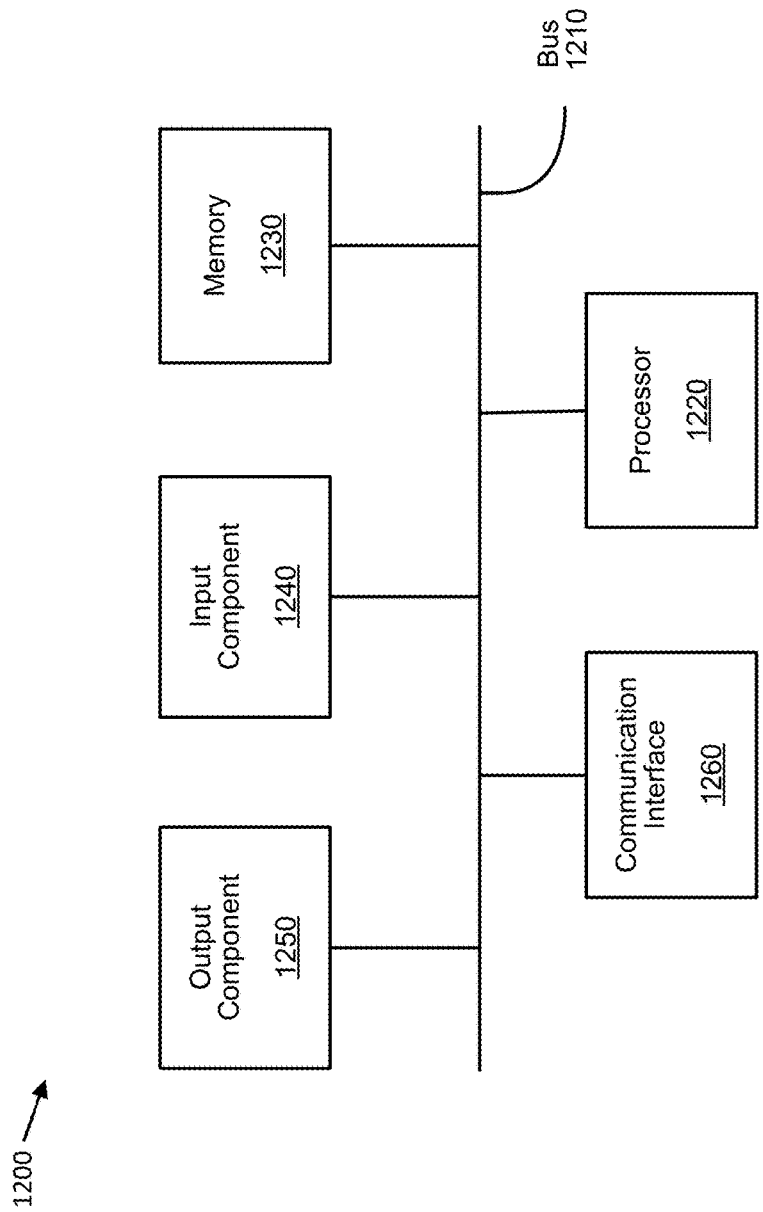

REMOTE MONITORING OF FRONTHAUL RADIO SIGNALS

BACKGROUND

Traditional cellular Radio Access Networks (RAN) consist of many stand-alone base transceiver stations (BTS). Each BTS may cover a small area and a group of BTS may together provide coverage over a larger continuous area. Each BTS may forward payload data received from mobile terminals, via a backhaul link or network, to a core network of the cellular communications network.

More recently, Cloud-RAN (C-RAN) architectures have been introduced for cellular networks. A C-RAN architecture may generally include a number of remote radio head (RRH) devices that are separated from a baseband unit (BBU). The RRHs may each be installed close to or as part of the antennas, and may implement the radio links with the mobile terminals. The RRHs may communicate with the BBU via a digital baseband signal. The BBU may process the digital baseband signals, which may be carried, by a fronthaul network between the RRHs and the BBUs. The fronthaul network may act to decouple the RRHs from the BBU and may provide flexibility in network planning and deployment, as the RRHs can be placed multiple kilometers (e.g., up to 40 kilometers) from the BBU.

In existing C-RAN architectures, trouble shooting and diagnostic testing of the fronthaul network may involve a technician physically visiting locations in the fronthaul network. For example, the fronthaul network may be implemented using an Ethernet-based optical connection. A technician may travel to nodes in the fronthaul network, manually connect a diagnostic device and analyze signals generated by the diagnostic device. The diagnostic device can include a spectrum and signal analyzer, which may operate to analyze the baseband radio signals that are transmitted through the fronthaul network. The diagnostic device can be relatively expensive. The time required by the technician to travel to the nodes in the fronthaul network can additionally be a source of expense.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 12 is a diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein may provide for the efficient monitoring and control of the fronthaul network in a C-RAN cellular communications network. One or more remote radio probes (RRPs) may be installed in the fronthaul network. Each RRP may be designed as to be permanently, or semi-permanently, placed in the fronthaul network. In one implementation, in which the fronthaul network is based on optical links, an RRP may connect to multiple optical links, such as by using multiple input ports or by using a switch to switch between the input optical links. The RRP may be designed to capture baseband radio data transmitted through the fronthaul network. The RRP may buffer and forward the captured baseband radio data to an analysis platform. The analysis platform may be a software implemented platform to perform signal and/or spectral analysis of the received baseband radio data.

Figure 1A:
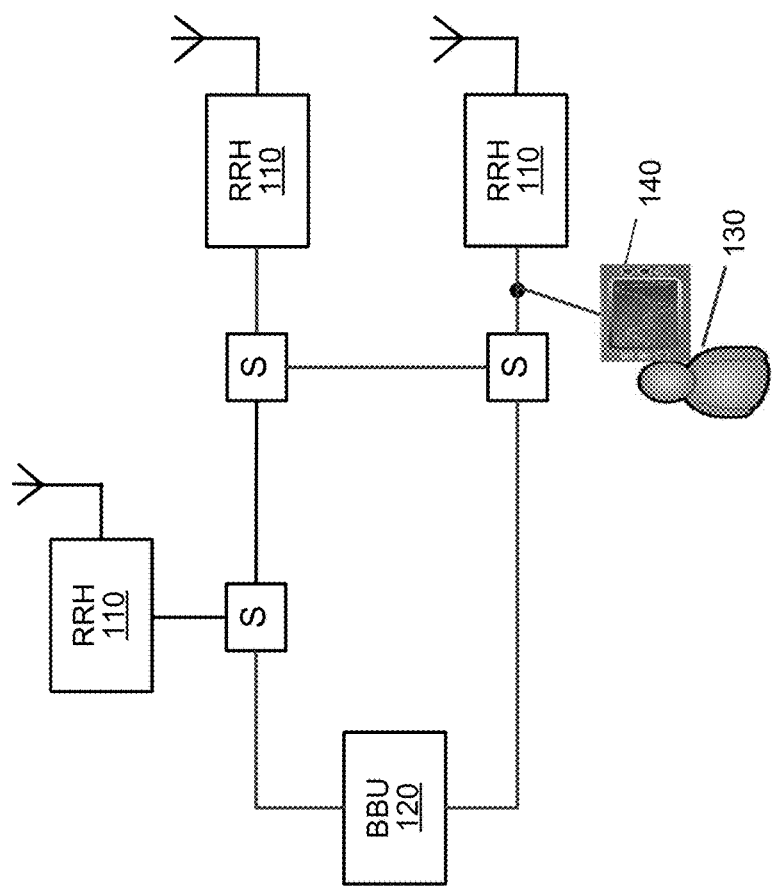
FIGS. 1A and 1B are diagrams illustrating an example overview of an implementation described herein.
Figure 1B:
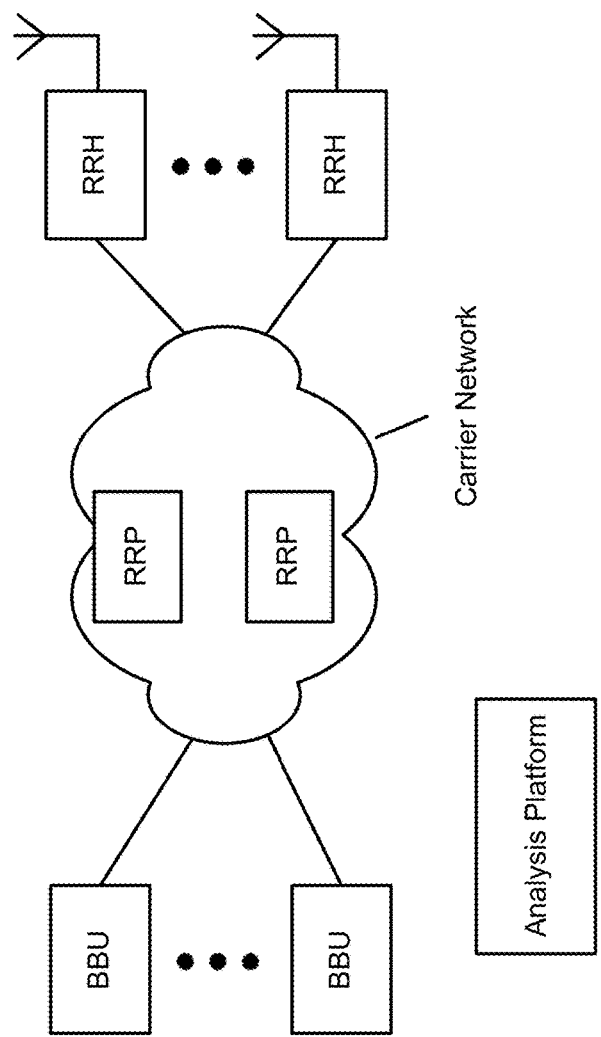

FIGS. 1A and 1B illustrate an example overview of an implementation described herein. FIG. 1A, in particular, illustrates a conventional C-RAN implementation of a fronthaul network, and FIG. 1B illustrates an example of a C-RAN implementation of the fronthaul network using RRPs.

As shown in FIG. 1A, a number of RRHs 110 may be connected, to a BBU 120, using a ring network structure, such as by using a series of Ethernet switches (S) connected via optical cabling. Baseband radio data may be exchanged, between the RRHs 110 and the BBU 120, using a protocol such as the in-phase and quadrature (IQ) over Ethernet protocol or the Common Public Radio Interface (CPRI).

In FIG. 1A, assume that the network operator desires to troubleshoot and or collect diagnostic information relating to the data exchange between RRHs 110 and BBU 120. A technician 130 may be dispatched, and may carry a spectrum and signal analyzer 140. Technician 130 may connect spectrum and signal analyzer 140 to the fronthaul network, such as via a port at a switch S. Spectrum and signal analyzer 140 may be a relatively expensive piece of equipment that is designed to monitor traffic and/or signals in the fronthaul network. Spectrum and signal analyzer 140 may include logic to sample the traffic (e.g., data units) in the fronthaul network, convert the traffic to an analog signal representing the baseband signal for an RRH 110, transform or otherwise perform analysis functions on the baseband signal, and provide (e.g., via a display) output diagnostic information to the technician.

Having a technician transport a dedicated spectrum and signal analyzer throughout the fronthaul network can be an expensive and time-consuming process. Consistent with aspects described herein, and as shown in FIG. 1B, the fronthaul network may be implemented as a carrier network (e.g., a Software Defined Network (SDN)) in which one or more RRPs are inserted. The RRPs may be permanent, or relatively permanent devices, within the fronthaul network. In some implementations, the functionality of an RRP may be included within an Ethernet switch within the carrier network.

The RRP may act to capture baseband radio data transmitted through the fronthaul network. Baseband radio data that may be transmitted, either in real-time or delayed, to an analysis platform. The analysis platform may include, for example, a server device that is implemented and maintained separately from the fronthaul network. For example, the analysis platform may include one or more server devices associated with the operator of the fronthaul network. In one implementation, the analysis platform may be a "cloud" implemented platform that can be dynamically scaled, or taken off-line, as needed.

Using the analysis platform, technicians can analyze and/or monitor traffic through the fronthaul network. The analysis platform may receive baseband radio data from multiple RRPs, and potentially from multiple RRPs located in multiple fronthaul networks.

The architecture of FIG. 1B, by omitting the data analysis functions from the RRP, can be cost-effectively designed and implemented. The analysis of the captured baseband radio data may be performed remotely, at a network or cloud-based analysis platform. Advantageously, processing capacity of the analysis platform can be dynamically scaled as needed and functionality associated with the analysis platform can be updated as needed.

Figure 2:
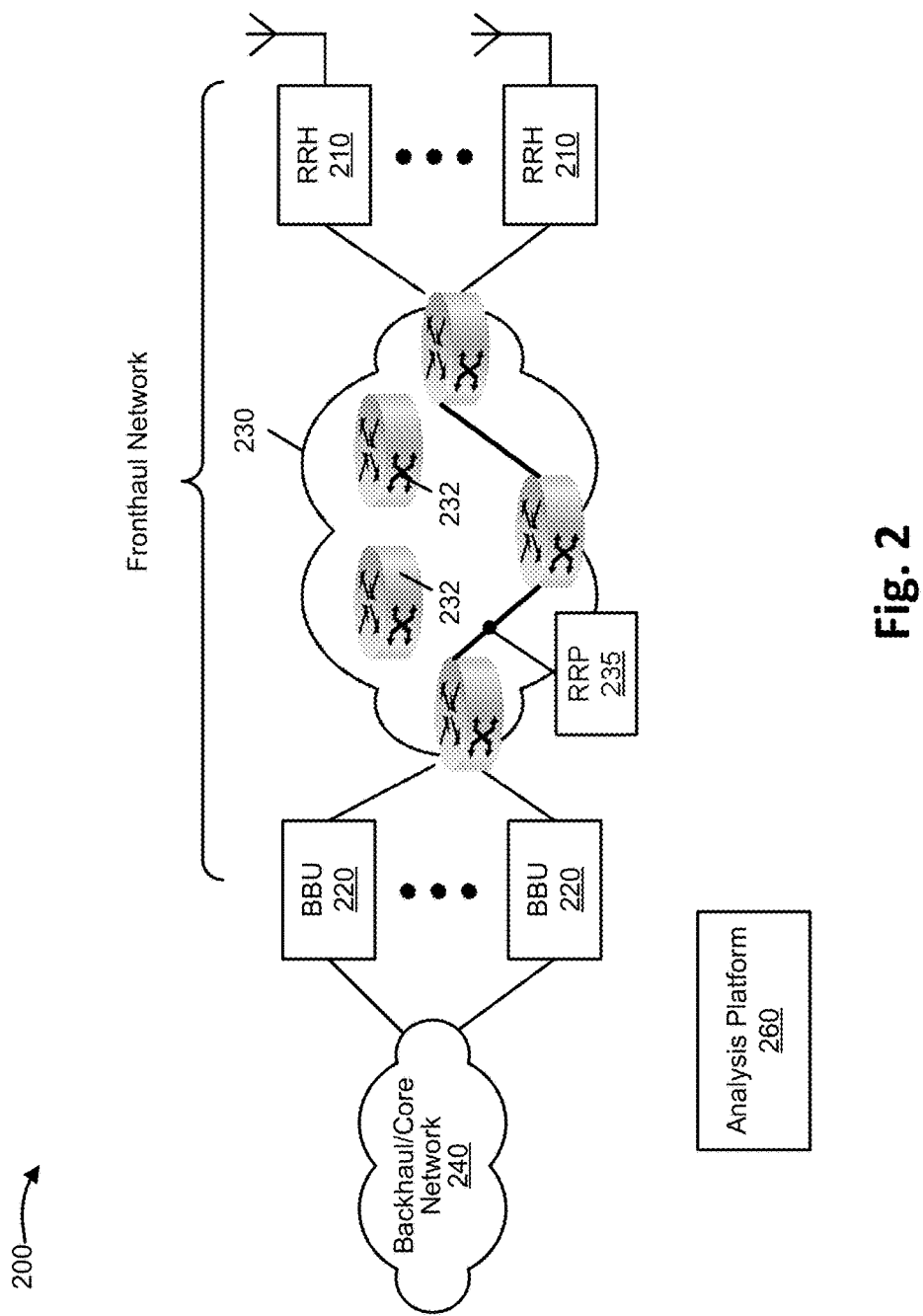
FIGS. 2 and 3 are diagrams of example environments in which systems and/or methods described herein may be implemented.

FIG. 2 is a diagram of an example environment 200 in which systems and/or methods described herein may be implemented. Environment 200 may correspond to an environment in which the fronthaul network uses IQ over Ethernet to transport the baseband radio data between RRHs and BBUs. IQ signals (also called IQ data or IQ samples) are a known technique for representing baseband radio signals. IQ over Ethernet may refer to a technique in which IQ data is communicated using Ethernet technologies (e.g., using Ethernet as the link layer).

As shown in FIG. 2, the fronthaul network portion of a cellular communication network may include one or more RRHs 210; one or more BBUs 220; and a carrier network 230, to connect the RRHs to the BBUs. Environment 200 may also include backhaul/core network portion 240, which may implement a core portion of the cellular network and to provide connectivity to BBUs 220. Carrier network 230 may include a number of switches 232 (or other networking devices) and one or more RRPs 235. Environment 200 may additionally include analysis platform 260. Analysis platform 260 may be connected to RRPs 235 in a number of possible ways, such as, for example, by a direct connection to carrier network 230, through a connection with backhaul/core network 240, and/or via a connection with an external network (e.g., analysis platform 260 may be connected to an external packet network (not shown) to which backhaul/core network 240 is connected).

RRHs 210 may each include a remote radio transceiver that can be used to extend the coverage of a base station. Each RRH 210 may include radio frequency (RF) circuitry plus analog-to-digital converters, digital-to-analog converters, and up/down converters. In the example of FIG. 2, RRHs 210 may connect to BBUs 220 using IQ over Ethernet (transmitted via carrier network 230).

BBUs 220 may provide for baseband processing for the cellular network. BBUs 220 may include digital signal processors to process voice signals (and other signals). BBUs 220 may communicate with backhaul/core network 240. BBUs 220, potentially in conjunction with RRHs 210, may, in the context of a Long Term Evolution (LTE) network, be referred to as Evolved NodeBs (eNBs).

Carrier network 230 may include an Ethernet-based network in which the links between switches 232 include relatively high speed links (e.g., optical fiber). In one implementation, the network may be a Software Defined Network (e.g., routes in the network may be dynamically configurable). Carrier network 230 may be used to transport, using IQ over Ethernet, the baseband radio data between RRHs 210 and BBUs 220.

RRPs 235, as previously mentioned, may each be designed to be permanently, or semi-permanently, placed in fronthaul network, such as by being attached to switches 232, connected to fiber optic links in the fronthaul network, and/or by being connected to RRHs 210. More generally, RRPs 235 may be located at arbitrary locations in the fronthaul network, such as in shopping malls, business locations, home residences, etc. RRPs 235 may each include logic to capture and buffer IQ data. In one implementation, RRP 235 may passively capture the IQ data (i.e., store a copy of the IQ data without changing the destination of the IQ data in the network). RRP 235 may further forward the IQ data, or a processed (e.g., compressed) version of the IQ data to analysis platform 260. An example implementation of RRP 235 will be described in more detail below with reference to FIG. 5.

Backhaul/core network 240 may correspond to a portion of a cellular network that performs control and management functions for the cellular network. In an implementation in which the cellular network includes an LTE-based network, backhaul/core network 240 may include an evolved packet core (EPC) network that operates based on a third generation partnership project (3GPP) wireless communication standard. The EPC network may include one or more serving gateways (SGWs), mobility management entities (MMEs), and/or packet data network gateways (PGWs).

Analysis platform 260 may include one or more computing devices to analyze IQ data received from the RRPs 235. Analysis platform 260 may, for example, perform spectrum analysis and signal analysis functions. Analysis platform 260 may, in some implementations, be implemented in a cloud-based environment in which the capacity of analysis platform 260 can be increased or decreased on demand.

Figure 3:
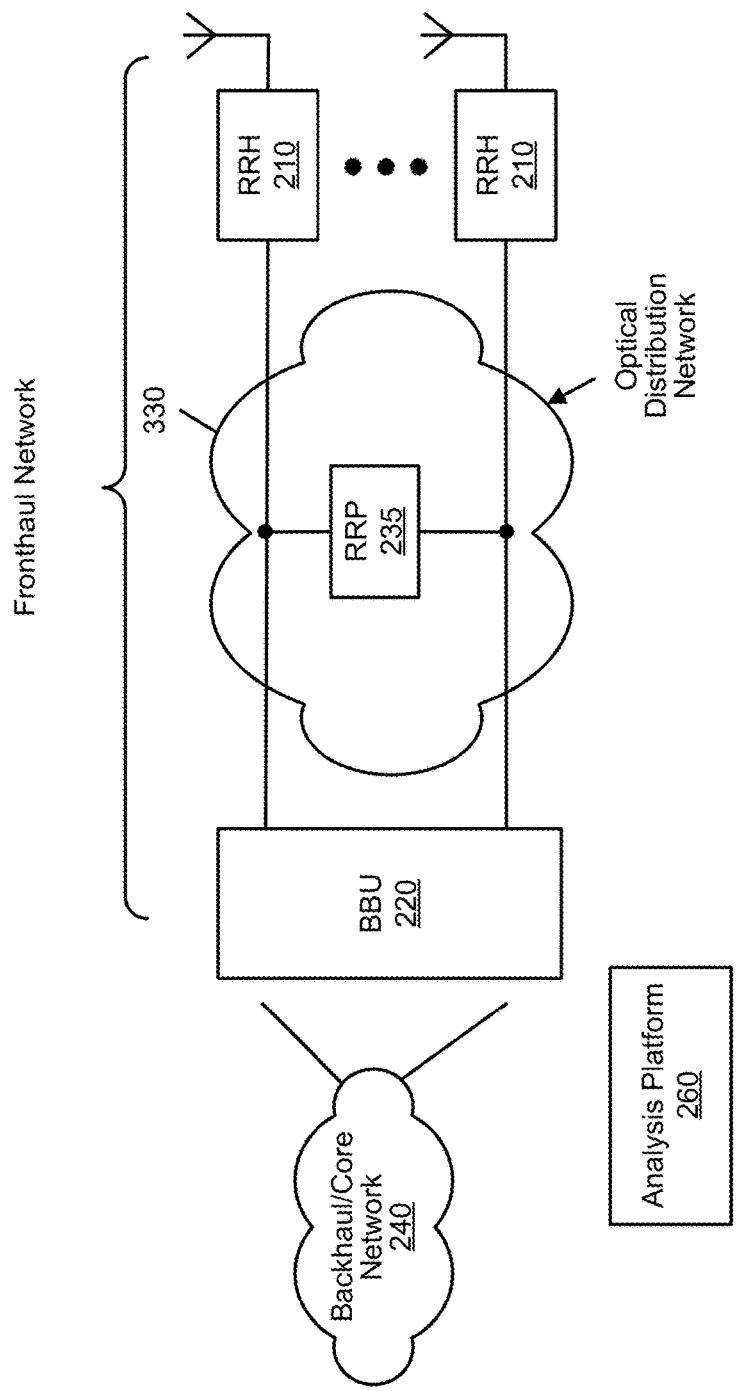

FIG. 3 is a diagram of another example environment 300 in which systems and/or methods described herein may be implemented. Environment 300 may correspond to an environment in which the fronthaul network uses the Common Public Radio Interface (CPRI) protocol to transport the baseband radio data between the RRHs and the BBUs. In the example of FIG. 3, carrier network 330 may be implemented in which a dedicated fiber link is used between each RRH 210 and BBU 220.

RRP 235, in the implementation of FIG. 3, may be designed to be able to connect to multiple fiber links. For example, RRP 235 may include a switch (e.g., an optical mechanical switch) through which RRP 235 can select a particular one of the connected fiber links for monitoring. In this manner, RRP 235 may, at different times, monitor the data being communicated with different RRHs 210. In some implementations, RRP 235, to communicate with analysis platform 260, may be connected, via a dedicated link, with BBU 220 or with another network device. Alternatively, or additionally, RRP 235 may be capable of injecting data into one or more of the connected optical links.

Figure 4:
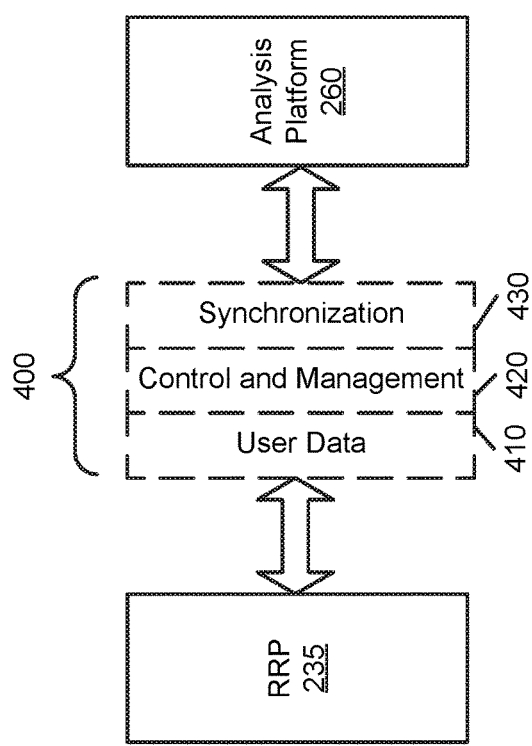
FIG. 4 is a diagram illustrating an example high level reference model illustrating types of data that may be communicated between Remote Radio Probes (RRPs) and an analysis platform.

FIG. 4 is a diagram illustrating an example high level reference model illustrating types of data that may be communicated between RRPs 235 and analysis platform 260. In this example, data 400 may be communicated, such as via Ethernet encapsulation, using carrier network 230. Data 400 may include user data 410, control management data 420, and synchronization data 430.

User data 410 may include the IQ data (i.e., the baseband radio data) that is transmitted between RRHs 210 and BBUs 220, and captured by RRP 235. In one implementation, RRP 235 may transfer all of the IQ data (or all of the IQ data received in a particular sample time period) to analysis platform 260. Alternatively, or additionally, RRP 235 may transfer only some of the IQ data, such as just the in-phase (the "I" signal) or just the quadrature (the "Q" signal) to analysis platform 260. Still further, in other possible implementations, RRP 235 may transfer a filtered, compressed, or pre-processed version of the IQ data to analysis platform 260.

Control and management data 420 may include vendor specific data, data specific to RRP 235 (e.g., RRP 235 identification or version information), or other information relating to the control and management of RRP 235. In one implementation, control and management data 420 may include data used to control the operation of RRP 235. For example, analysis platform 260 may control RRP 235 to schedule monitoring by RRP 235 and/or indicate what is to be included in user data 410. Synchronization data 430 may include timing data or other data needed to synchronize the operation of RRP with the network.

Figure 5:
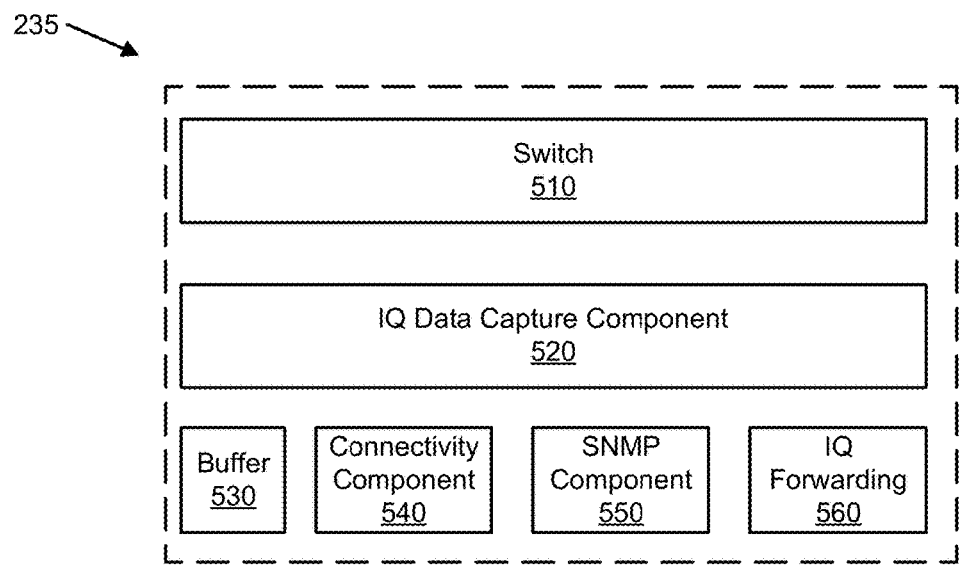
FIG. 5 is a diagram that conceptually illustrates functional components of a RRP.

FIG. 5 is a diagram that conceptually illustrates functional components of RRP 235. As shown, RRP 235 may include a switch 510, IQ data capture component 520, buffer 530, connectivity component 540, Simple Network Management Protocol (SNMP) component 550, and IQ forwarding component 560.

Switch 510 may include a mechanical, electrical, or electromechanical switch to enable RRP 235 to selectively connect to multiple inputs. For example, as previously mentioned, RRP 235 may be an optical switch that is placed at a location proximate to multiple fiber optic lines, potentially corresponding to connections with different RRHs 210. Switch 510 may be used to allow RRP 235 to selectively monitor the IQ data associated with the different RRHs.

IQ data capture component 520 may include logic to capture IQ data. IQ data capture component 520 may, for example, sample Ethernet or CPRI frames and extract the IQ data from the frames. In some implementations, the Institute of Electrical and Electronics Engineers (IEEE) 1904.3 standard may be used to transport the IQ data. In some implementations, IQ data capture component 520 may perform additional functions on the captured IQ data, such as filtering or compressing the IQ data. IQ data capture component 520 may passively capture the IQ data, such as by making a copy of the IQ data without interrupting the communication of the IQ data between the RRHs and the BBUs.

The captured IQ data may be stored by buffer 530. Connectivity component 540 may operate to connect RRP 235 to analysis platform 260. SNMP is a protocol for collecting and organizing information about managed devices on Internet Protocol (IP) networks. SNMP component 550 may operate to implement the SNMP protocol. Connectivity component 540 may operate in conjunction with SNMP component 550 to connect with and provide status information to analysis platform 260. Through SNMP component 550, RRP 235 may receive control and management instructions from analysis platform 260. For example, analysis component 260 may indicate, to RRP 235, which of a plurality of input optical links are to be selected by optical switch 510 for data capture by IQ data capture component 520. In this manner, analysis component 260 may remotely control the operation of RRP 235. Additional management protocols might be used such as the NetConf protocol.

IQ forwarding component 560 may include a network component to perform functions specific to the forwarding of IQ data to analysis platform 260. For example, IQ forwarding component 560 may operate to compress and/or reformat the IQ data. The IQ data may be forwarded, by IQ forwarding component 560, using, for example, a streaming technique or using a protocol such as the File Transfer Protocol (FTP).

Figure 6:
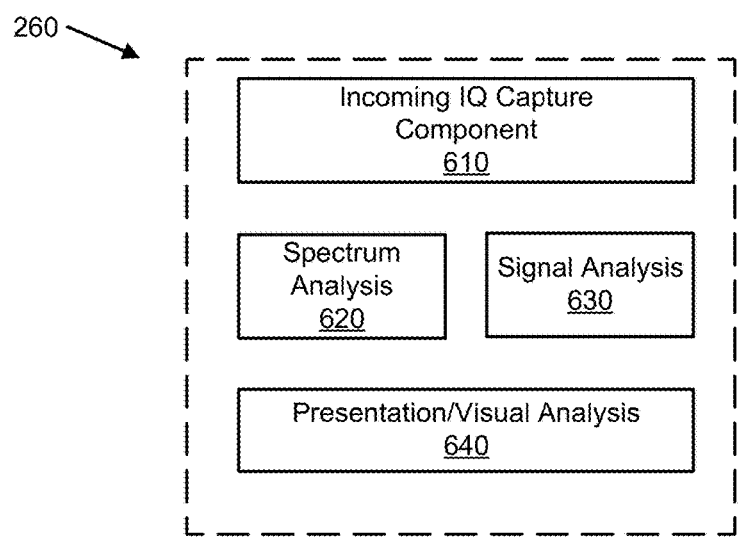
FIG. 6 is a diagram that conceptually illustrates functional components of an analysis platform.

FIG. 6 is a diagram that conceptually illustrates functional components of analysis platform 260. As shown, analysis platform 260 may include incoming IQ capture component 610, spectrum analysis component 620, signal analysis component 630, and presentation/visual analysis component 640. As previously mentioned, analysis platform 260 may be implemented as one or more processes associated with a server device or a cluster of server devices. Analysis platform 260 may be implemented as a process, which may allow the capacity of analysis platform 260 to be easily scaled up or down as needed.

Incoming IQ capture component 610 may implement the above-described communications, with RRPs 235, to obtain the IQ data from the RRPs 235 (and potentially including the control and management data and the synchronization data). The obtained IQ data may be stored for automatic analysis and/or interactive analysis that is performed by a technician. In some implementations, incoming IQ capture component 610 may convert the incoming digital IQ data to analog signals (i.e., the corresponding in-phase and quadrature signals).

Spectrum analysis component 620 may perform frequency domain processing of the IQ data to potentially measure the magnitude of an input IQ signal versus frequency. By analyzing the spectra of the input signals, dominant frequency, power levels, distortion, harmonics, bandwidth, and other spectral components of the IQ signals can be observed. In some implementations, spectrum analysis component 620 may be programmed to compare the spectral components of the IQ data to an expected pattern of the spectral components. Deviation from the pattern may indicate an error or anomalous operation condition may be communicated to a technician.

Signal analysis component 630 may perform time domain analysis, or other analysis, of the IQ data. For example, signal analysis component 630 may perform waveform generation, demodulation, filtering, equalization, or other operations. Spectrum analysis component 620 and signal analysis component 630 may together be used to perform diagnostic processes on the IQ data, monitor the quality of the IQ data that is being communicated with RRHs 210, extract other information (e.g., cell identifier information), and/or determine appropriate filters or amplification patterns that could be applied to the IQ data to improve the quality.

Presentation/visual analysis component 640 may provide user interface functions through which a technician can interact with spectrum analysis component 620 and signal analysis component 630. Presentation/visual analysis component 640 may, for example, provide a number of predetermined graphs, charts, or other graphical indicators that can be used to visualize or assess the IQ data.

Figure 7:
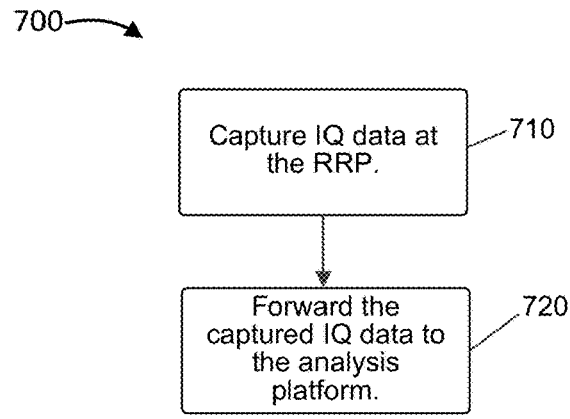
FIG. 7 is a flowchart of an example process describing the operation of the RRP.

FIG. 7 is a flowchart of an example process 700 describing the operation of RRP 235. Process 700 may include capturing IQ data at the RRP (block 710). As previously mentioned, the IQ data may be passively captured (i.e., without interrupting the transmission of the IQ data between RRH 210 and BBU 220), by RRP 235, in the fronthaul network. In different embodiments, RRP 235 may be configured to capture the IQ data transmitted using IQ over Ethernet or IQ data transmitted via CPRI. Capturing the IQ data may include buffering the IQ data.

Process 700 may further include forwarding the captured IQ data to analysis platform 260 (block 720). For example, IQ forwarding component 560 may transmit the captured IQ data to analysis platform 260. The captured IQ data may be transmitted through the fronthaul network or via another network.

Figure 8:
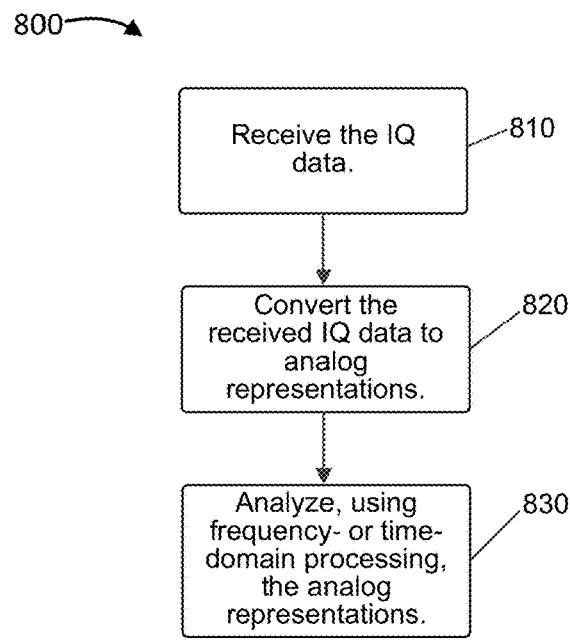
FIG. 8 is a flowchart of an example process describing the operation of the analysis platform.

FIG. 8 is a flowchart of an example process 800 describing the operation of RRP 235. Process 800 may include receiving IQ data, transmitted from an RRP, at the analysis platform (block 810). The received IQ data may be converted to analog representations (block 820). For example, as previously mentioned, the received IQ data may be a digitized and packetized representation of the analog in-phase (I) and quadrature (Q) signals. Incoming IQ capture component 610 may thus convert the received IQ data into the in-phase and quadrature analog signals. The converted signals may then be analyzed using frequency (spectrum analysis) or time-domain processing (block 830). As previously mentioned, spectrum analysis and/or time-based signal analysis techniques may be applied by spectrum analysis component 620 and/or by signal analysis component 630. The spectrum/signal analysis techniques may be used to implement automated or manual analysis operations. For example, in one implementation, values generated by spectrum analysis component 620, such as power spectral values for certain frequency bands (or other values), may be compared to threshold power values, and the comparison may be used to trigger automated alerts or automated actions. Alternatively, or additionally, a technician may, using presentation/visual analysis component 640, interactively control spectrum analysis component 620 and/or signal analysis component 630.

As previously mentioned, in some implementations, IQ data may be transmitted between RRP 235 and analysis platform 260 using a streaming protocol. One possible implementation of a streaming protocol will next be discussed with reference to FIGS. 9-11. In this implementation, RRP 235 may act as a Network Functions Virtualization (NFV) module and analysis platform 260 may act as a corresponding SDN controller.

Figure 9:
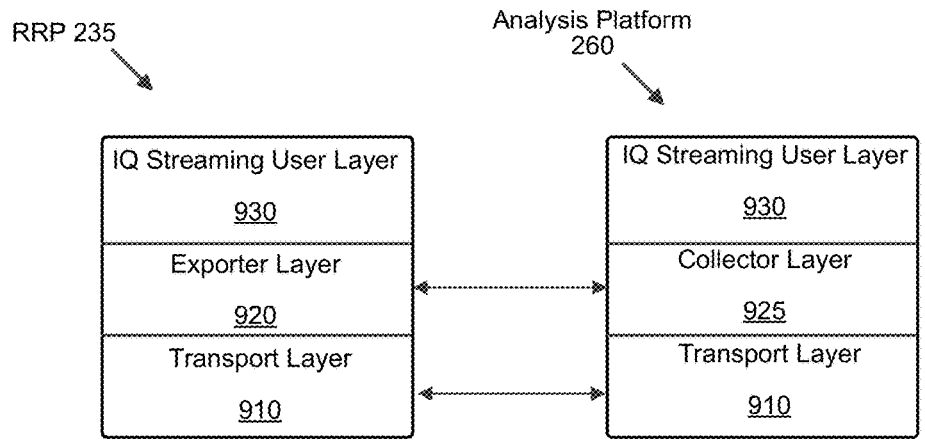
FIG. 9 is a diagram illustrating an example of protocol stacks, for the RRP and the analysis platform, relating to the streaming of IQ data.

FIG. 9 is a diagram illustrating an example of protocol stacks, for RRP 235 and analysis platform 260, relating to the streaming of IQ data. As shown, the protocol stacks at RRP 235 and analysis platform 260 may include transport layer 910, exporter layer 920 (at RRP 235) or collector layer 925 (at analysis platform 260), and IQ streaming user layer 930.

Transport layer 910 may implement a connection oriented transport protocol, such as Transmission Control Protocol (TCP), Stream Control Transmission Protocol (SCTP), or Blocks Extensible Exchange Protocol (BEEP). Transport layer 910 may generally be responsible for delivering IQ streaming protocol messages between exporter/collector layers 920/925. Traffic flowing between exporter layer 920 and collector layer 925 may include IQ over Ethernet (e.g., IEEE P1904.3) data or CPRI data. In some implementations, exporter layer 920 may be associated with multiple collector layers 925 via a multicast scheme. Connections, in the IQ streaming protocol, may be established by either exporter layer 920 or collector layer 925. IQ streaming user layer 930 may represent the application layer logic for RRP 235 and/or analysis platform 260.

In one implementation of the IQ steaming protocol, collector layer 925 may query the status of exporter layer 920 by sending, subsequent to the establishment of a connection, of a query message. Exporter layer 920 may respond to the query message. One example of an appropriate response message may be the response message "GET SESSIONS," which may return information about the session available to exporter layer 920.

In some implementations, a number of messages, for the IQ streaming protocol, may be defined to support flow control. The messages may include: a "FLOW START" message, which may be sent by collector layer 925 to indicate that the collector layer is ready to receive data; a "FLOW STOP" message, which may be sent by collector layer 925 to indicate that the collector layer is not ready to receive data; a "SESSION START" message, which may be sent by exporter layer 920 to indicate that an IQ stream is actively flowing to a collector layer; and a "SESSION STOP" message, which may be sent by an exporter layer 920 to indicate that an IQ stream, to a collector, is no longer active.

Data transfer, using the IQ streaming protocol, may be performed using a series of data messages that each include payload data. The data messages may be transmitted from exporter layer 920 to collector layer 925. Each data message may contain a Data Sequence Number (DSN). The DSN may be incremented by one for each new data message. Collector layer 925 may accept all in-sequence data messages.

When exporter layer 920 and collector layer 925 are in the "connected" state, collector layer 925 may indicates its willingness to participate in sessions by issuing the "FLOW START" message for each target session. A corresponding exporter layer 920 may indicate the status of a given session with a collector via the "SESSION START" and "SESSION STOP" messages.

Figure 10:
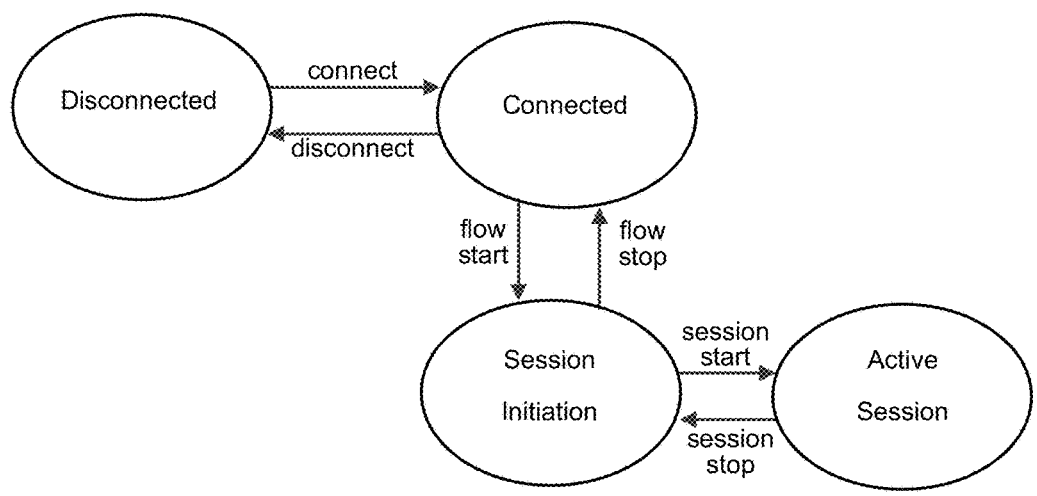
FIG. 10 is an example state diagram.

FIG. 10 is an example state diagram using the above-discussed flow messages. As shown, communicating entities (e.g., exporter layer 920 of RRP 235 and collector layer 925 of analysis platform 260) may transition between the "connected" and "disconnected" state. When in the "connected" state, collector layer 925 may use a "FLOW START" message to enter the "Session Initiation" state with exporter layer 920. The "Session Initiation" state may be completed, to enter an "Active Session" state via the exchange of a "SESSION START" message. In the "Active Session" state, IQ data may be exchanged.

Figure 11:
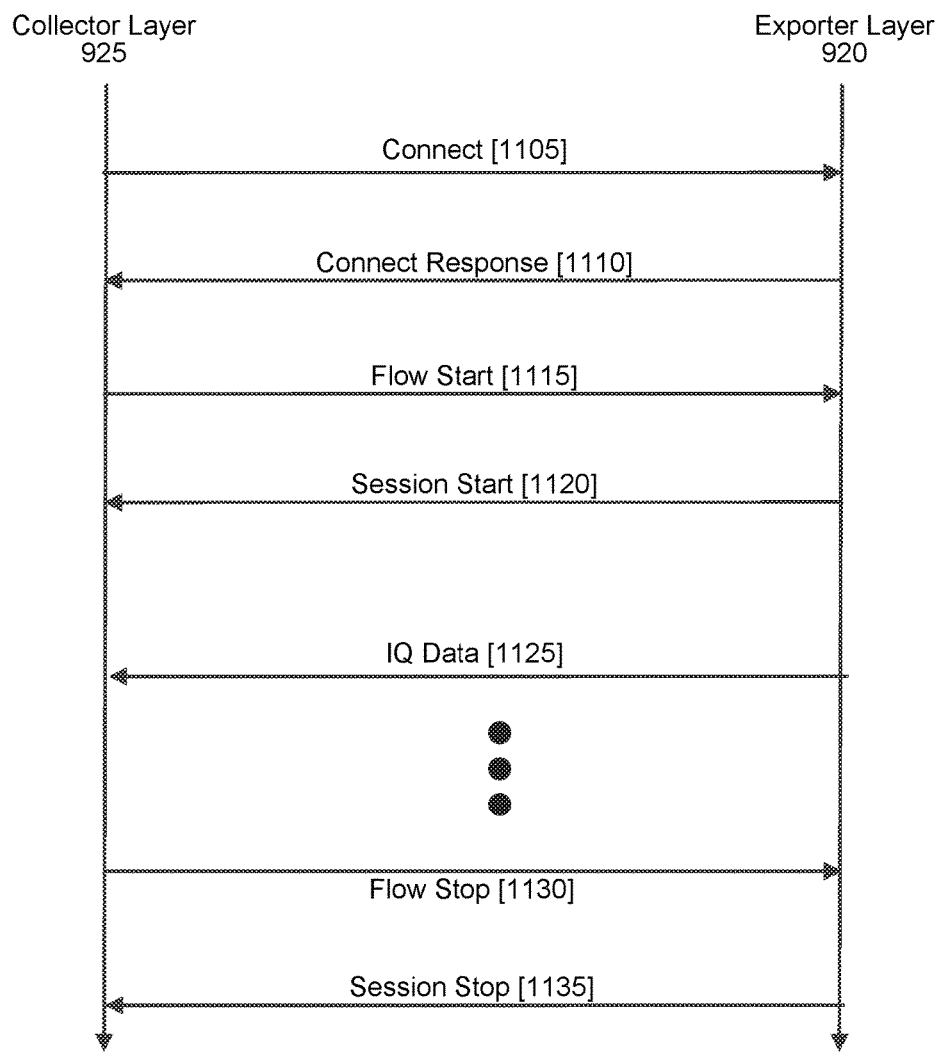
FIG. 11 is an example of a high level sequence diagram illustrating the exchange of messages and data.

FIG. 11 is an example of a high level sequence diagram illustrating the exchange of messages and data between exporter layer 920 and collector layer 925. As shown, a "Connect" request message (at 1105) may be transmitted from collector layer 925 (e.g., the collector layer of analysis platform 260) to exporter layer 920 (e.g., the exporter layer of an RRP 235). Exporter layer 920 may respond with a "Connect Response" message (at 1110). Subsequently, collector layer 925 may initiate streaming of an IQ data flow by transmitting a "FLOW START" message (at 1115). Exporter layer 920 may correspondingly respond with a "SESSION START" message (at 1120). IQ data may then be transmitted by exporter layer 920 and to collector layer 925 (at 1125).

Collector layer 925, at some point, may determine to stop the flow of IQ data. At this point, collector layer 925 may issue a "FLOW STOP" message (at 1130). Exporter layer 920 may acknowledge the stop message with a corresponding "SESSION STOP" message (at 1135).

In some implementations, timing synchronization for RRP 235 may be implemented using the IEEE 1588 Precision Time Protocol (PTP) for time/phase/frequency synchronization via Ethernet with nanosecond accuracy. PTP may be particularly implemented using the following standards: the IEEE 1588-2008 standards and the IEEE802.1AS standard. Timing synchronization for analysis platform 260 may be performed using the PTP, GPS timing, and/or NTP timing with the appropriate stratum. In some implementations, a delta timing technique may be applied to mitigate the delay associated with IQ data transmission time.

FIG. 12 is a diagram of example components of a device 1200. Each of the devices illustrated in FIGS. 1-6 may include one or more devices 1200. Device 1200 may include bus 1210, processor 1220, memory 1230, input component 1240, output component 1250, and communication interface 1260. In another implementation, device 1200 may include additional, fewer, different, or differently arranged components. As described herein, a component may be implemented by hardware circuitry, software logic, and/or some combination thereof.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes (LEDs), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of blocks/acts have been described with regard to FIGS. 7, 8, and 11, the order of the blocks/acts may be modified in other implementations. Further, non-dependent blocks may be performed in parallel. Similarly, while series of communications have been described with regard to several of the figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device comprising:
   an optical switch to receive multiple optical links in a fronthaul network of a cellular network and to output a selected first one of the received optical links;
   a data capture component to passively capture baseband radio data transmitted, via the selected first optical link, between a remote radio head (RRH) and baseband unit (BBU) in the fronthaul network of the cellular network; and
   a networking component to:
      forward the captured radio data, via a packet data network that is separate from the cellular network, to an analysis platform located outside of the fronthaul network, and
      receive instructions, indicating a different second optical link, of the multiple optical links, than the first optical link, from the analysis platform,
   wherein the data capture component is further configured to:
      receive the instructions indicating the second optical link of the multiple optical links, and
      based on the received instructions, passively capture baseband radio data transmitted via the second optical link, in lieu of the first optical link.

2. The network device of claim 1, wherein the baseband radio data, transmitted between the RRH and the BBU, includes digitized in-phase and quadrature (IQ) signals.

3. The network device of claim 1, wherein the baseband radio data is captured, by the data capture component, as Ethernet over in-phase and quadrature (IQ) data.

4. The network device of claim 1, wherein the baseband radio data is captured from a Common Public Radio Interface (CPRI) link.

5. The network device of claim 1, wherein the network component is to forward the captured radio data using a streaming technique.

6. The network device of claim 1, wherein the analysis component provides frequency- and time-based analysis functionality.

7. The network device of claim 1, wherein the network component includes a transport layer based on Transmission Control Protocol (TCP), Stream Control Transmission Protocol (SCTP), or Blocks Extensible Exchange Protocol (BEEP).

8. The network device of claim 1, wherein the multiple optical links of the optical switch are associated with multiple corresponding RRHs.

9. A method, implemented by a network device, the method comprising:
   receiving multiple optical links of a fronthaul network of a cellular network;
   selecting, using an optical switch of the network device, a first one of the multiple optical links;
   passively capturing baseband radio data transmitted, via the selected first optical link, between a remote radio head (RRH) and baseband unit (BBU) in the fronthaul network of the cellular network;
   forwarding, via a packet data network that is separate from the cellular network, the captured radio data to an analysis platform located outside of the fronthaul network;
   receive instructions from the analysis platform, the instructions indicating a different second optical link, of the multiple optical links; and
   implementing instructions received, from the analysis platform, relating to control of the network device, the implementing including passively capturing baseband radio data transmitted via the second optical link in lieu of the first optical link.

10. The method of claim 9, wherein the baseband radio data, transmitted between the RRH and the BBU, includes digitized in-phase and quadrature (IQ) signals.

11. The method of claim 9, wherein the baseband radio data is captured as Ethernet over in-phase and quadrature (IQ) data.

12. The method 9, wherein the baseband radio data is captured from a Common Public Radio Interface (CPRI) link.

13. The method of claim 9, wherein forwarding the captured radio data is performed using a streaming technique.

14. The method of claim 9, wherein the multiple optical links of the optical switch are associated with multiple corresponding RRHs.

15. A non-transitory computer-readable medium containing one or more program instructions, for execution by one or more processors, to:
   receive multiple optical signals, from multiple corresponding optical links, from a fronthaul network of a cellular network;
   output, by an optical switch, the optical signals corresponding to a selected first optical link, of the multiple optical links;
   capture baseband radio data, associated with the received optical signals that correspond to the selected first optical link, transmitted between a remote radio head (RRH) and baseband unit (BBU) in the fronthaul network of the cellular network;
   forward, via a packet data network (PDN) that is external to the fronthaul network, the captured radio data to an analysis platform located outside of the fronthaul network;
   receive, via the PDN, instructions from the analysis platform, the instructions including an indication of a different second optical link, of the multiple optical links; and
   implement the instructions received from the analysis platform, the implementing including capturing baseband radio data, associated with received optical signals that correspond to the second optical link indicated in the instructions from the analysis platform.

16. The computer-readable medium of claim 15, wherein the baseband radio data, transmitted between the RRH and the BBU, includes digitized in-phase and quadrature (IQ) signals.

17. The computer-readable medium of claim 15, wherein the baseband radio data is captured as Ethernet over in-phase and quadrature (IQ) data.

18. The computer-readable medium of claim 15, wherein the baseband radio data is captured from a Common Public Radio Interface (CPRI) link.

19. The computer-readable medium of claim 15, wherein forwarding the captured radio data is performed using a streaming technique.

20. The non-transitory computer-readable medium of claim 15, wherein the multiple optical links of the optical switch are associated with multiple corresponding RRHs.

* * * * *